(No Model.) 2 Sheets—Sheet 1.

R. F. ELLIS & C. A. NORMAN.
VELOCIPEDE.

No. 305,061. Patented Sept. 16, 1884.

WITNESSES
N. W. Mortimer
E. G. Siggers

R. F. Ellis
C. A. Norman
INVENTORS
by C. A. Snow & Co.
Attorneys (No Model.) 2 Sheets—Sheet 2.
R. F. ELLIS & C. A. NORMAN.
VELOCIPEDE.
No. 305,061. Patented Sept. 16, 1884.
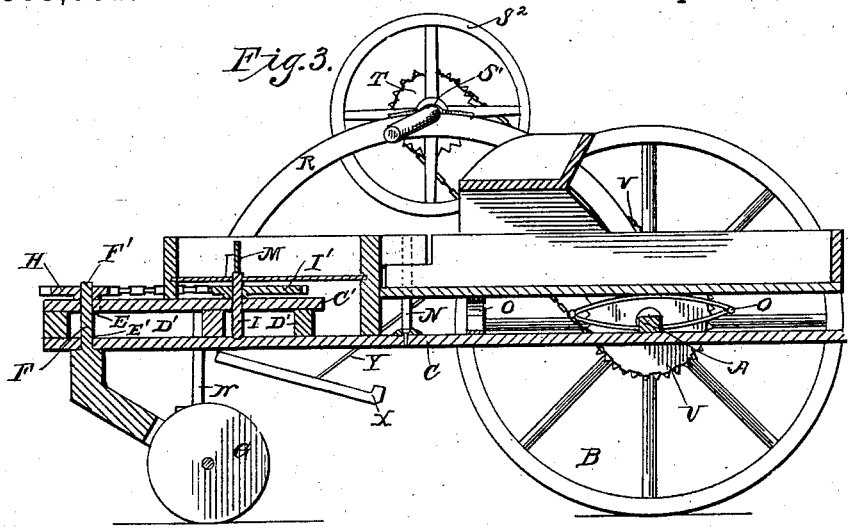
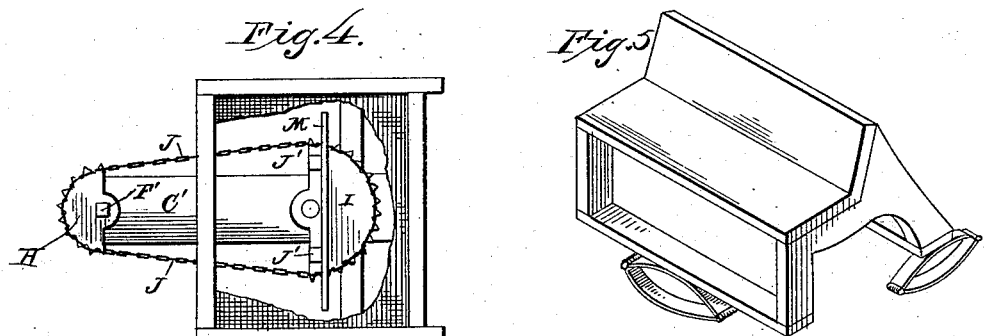
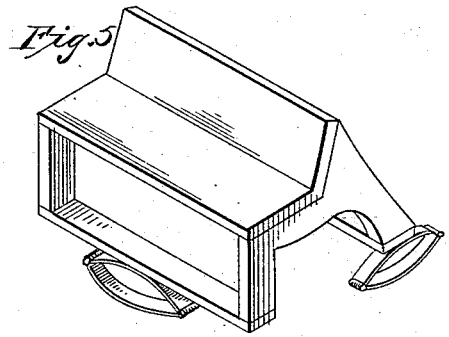
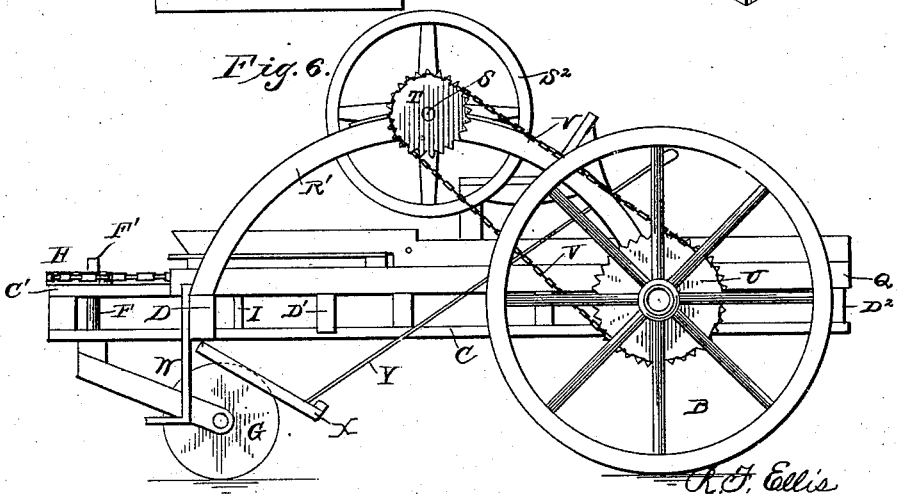
WITNESSES
N. W. Mortimer.
E. G. Siggers.
R. F. Ellis
C. A. Norman
INVENTORS
by C. A. Snow & Co.
Attorneys

UNITED STATES PATENT OFFICE.

ROBERT FULLER ELLIS AND CORNELIUS ASBURY NORMAN, OF WHITT, TEX.

VELOCIPEDE.

SPECIFICATION forming part of Letters Patent No. 305,061, dated September 16, 1884.

Application filed July 11, 1884. (No model.)

*To all whom it may concern:*

Be it known that we, ROBERT F. ELLIS and CORNELIUS A. NORMAN, citizens of the United States, residing at Whitt, in the county of Parker and State of Texas, have invented a new and useful Vehicle, of which the following is a specification, reference being had to the accompanying drawings.

Our invention has relation to vehicles that are designed to be driven by hand-power and guided by foot-power by the occupant or occupants of the vehicle; and it has for its objects to provide a vehicle of the class referred to that shall possess superior advantages in point of simplicity, inexpensiveness, durability, and general efficiency in the transportation of one or more persons, or persons and articles, over streets and smooth roads; and the invention consists in the construction and novel arrangement of parts, as will be hereinafter fully described, and particularly pointed out in the claims.

Figure 1:
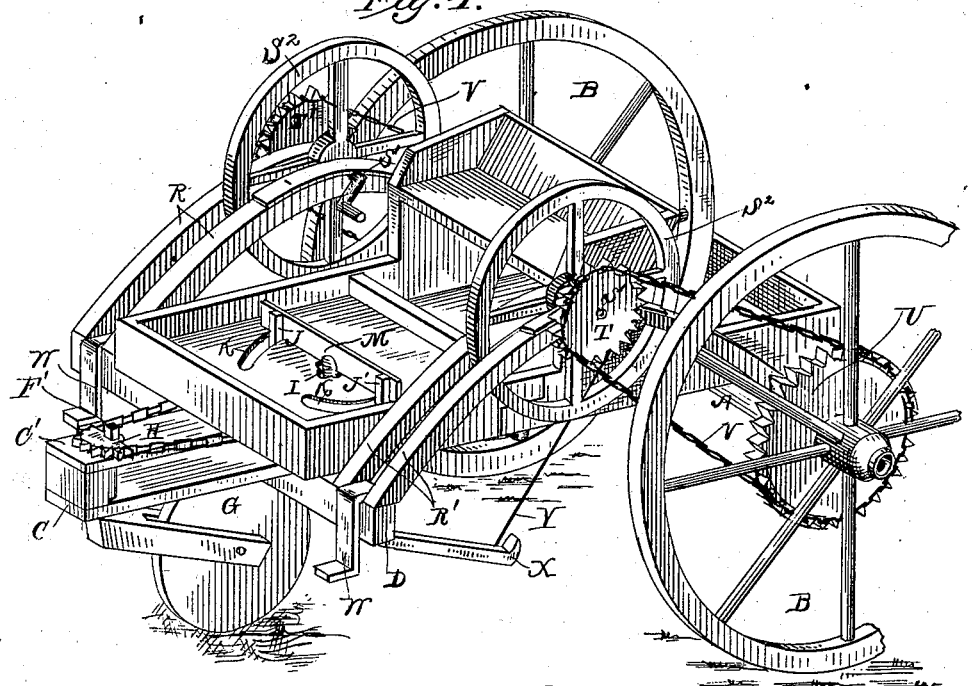
Figure 2:
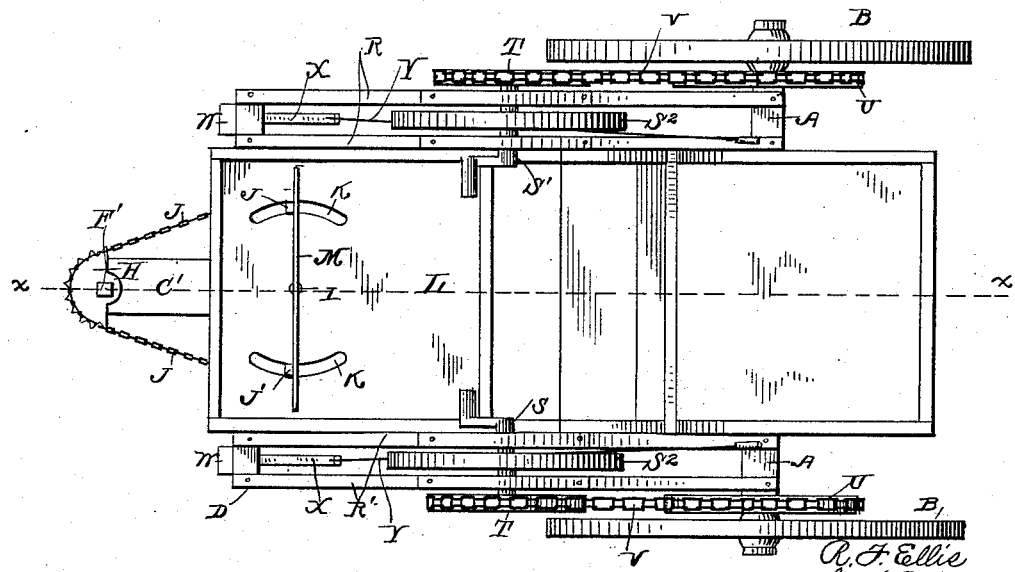

In the drawings, Figure 1 is a view in perspective of a vehicle embodying our improvements. Fig. 2 is a plan view. Fig. 3 is a vertical longitudinal section on the line $x$ $x$ in Fig. 2. Fig. 4 is a partial plan view, with the front portion of the bottom of the body of the vehicle broken away to show the mechanism for operating the guide-wheel. Fig. 5 is a detail view of the seat and the springs upon which it is mounted; and Fig. 6 is a side elevation showing the body made in two sections, the rear section, which supports the seat, being mounted on wheels.

Referring by letter to the accompanying drawings, A designates the axle, which is mounted on the wheels B B, and is connected by a reach, C, to the front cross-bar, D, of the vehicle. The reach C is secured to the under face of the axle A at its middle portion, and is let into a recess in the under face of the front cross-bar, D, at its middle portion, and extends for some distance in front of said cross-bar D, as shown. The ends of the cross-bar D project beyond the sides of the vehicle-body, and a short distance in the rear of said cross-bar D a second shorter cross-bar, D', is secured upon the reach C. Upon these two cross-bars D and D', and upon a block at the forward end of the reach C, is secured a longitudinal bar, C'. Near their forward ends, the reach C and bar C' with aligned vertical bearings E E' for the vertical spindle F of the caster-wheel or guide-wheel G. The upper end of the spindle F is made rectangular, and is provided on this rectangular portion F', which projects above the longitudinal bar C', with a small segmental gear-wheel, H, the teeth of which extend from an arc of a half-circle.

Near the rear end of the longitudinal bar C' a vertical standard, I, extends from the reach C up through the bar C', and forms a journal for a large segmentally-toothed gear-wheel, I', having its teeth also extending around an arc of a half-circle opposite the half-circle of the gear-wheel H on the shouldered end of the spindle F. These segmentally-toothed gears H and I' are connected by a sprocket-chain, J, and the gear-wheel I' is provided with arms J' J' at the terminals of the arc, which extend up through arc-slots K K in the bottom of the front section, L, of the body of the vehicle, and are connected at their upper ends by a foot-lever, M, pivoted on the upper end of the standard I. The front section, L, of the body of the vehicle is secured rigidly to the cross-bars on the reach, in order to prevent any interference with the action of the guiding mechanism. The rear section, which carries the seat, is connected to the front section, L, by a transverse rod, N, working in vertical guides N' at the rear end of said section, and said rear section is mounted on three springs, O, one at its front end on the reach and two near its rear end on the axle, as shown. We may, however, if desired, make the entire body rigid and mount the seat on springs, as shown in Fig. 5. In this instance the body is also made in sections; but they are longitudinal sections, the upper one of which is removable. In the latter instance side rails, Q, are secured to the axle and to the front and rear cross-bars, D and D², and the upper removable portion of the body is elevated at its forward end to provide room for the larger segmentally-toothed gear-wheel and sprocket-chain.

At each side of the vehicle-body we provide two arched parallel bars, R R', the rear ends of which are secured upon the axle just inside of the wheels B B, and the forward ends of the bars R R' are secured upon the projecting ends of the front cross-bar, D. At their middle portions the arched bars R R' are provided with bearings for the crank-shafts S S', the cranks being upon the inner ends of said shafts. Between each pair of parallel bars R R' the crank-shafts S S' are provided with balance-wheels S², and on their outer ends these shafts S S' are each provided with a sprocket-wheel, T. These sprocket-wheels T are in line with sprocket-wheels U on the inner faces of the supporting-wheels B B, and sprocket-chains V V connect the sprocket-wheels on the supporting-wheels B B with the sprocket-wheels on the crank-shafts S S'. The arch of the parallel bars R R' is sufficiently great to bring the bearings for the crank-shafts S S' at the proper height to enable the operator or operators to sit comfortably in the seat, which may be of any desired construction, and turn the cranks to propel the vehicle.

Steps W W are secured to the projecting ends of the front cross-bar, D, between the ends of the parallel bars R R'. Drop-braces X X are hinged to the under faces of the front cross-bar, D, near each end, and are connected by cords or chains Y, secured to them near their lower ends, to levers Z, fulcrumed to the body of the vehicle within convenient reach of the occupant, and adapted to engage racks on the side of the seat or other convenient place. These drop-braces are to be let down to steady the vehicle while a person is getting in and getting out of the vehicle. The cranks are turned to propel the vehicle, and the foot-lever is operated to change the direction by turning the caster-wheel. It is obvious that the cranks can be operated independently of each other, and may be turned in either direction, so that the vehicle may be backed and turned, as well as propelled forward, in any desired direction.

The vehicle may be built of any desired dimensions, either in large size for transporting persons and goods and wares or in smaller sizes for children's uses.

Having thus fully described our invention, what we claim as new, and desire to secure by Letters Patent of the United States, is—

1. The combination, with the body of the vehicle, secured to the axle and the front cross-bar, of the supporting-wheels provided with sprocket-wheels on their inner faces, the arched parallel bars secured to the axle and to the projecting ends of the front cross-bar, at the sides of the vehicle-body, and having bearings at their middle portions, the crank-shafts in said bearings provided with the fly-wheels and the sprocket-wheels at their outer ends, the sprocket-chains connecting the sprocket-wheels on the supporting-wheels with the sprocket-wheels on the crank-shafts, and mechanism, substantially as described, for guiding said vehicle, as set forth.

2. The combination, with the body of the vehicle, connected to the axle, reach, and front cross-bar mounted on the supporting-wheels and caster-wheel, of the small segmental toothed gear-wheel on the spindle of the caster-wheel, the large segmental toothed gear-wheel on a standard in rear of the spindle of the caster-wheel, said large gear-wheel being provided with vertical arms extending up through arc-slots in the bottom of the vehicle body, and connected at their upper ends by a foot-lever pivoted on the standard for said large gear-wheel, and the sprocket-chain connecting said segmental gears, substantially as specified.

3. The combination, with the vehicle-body mounted on the supporting-wheels and caster-wheel, of the drop-braces hinged to the under face of the projecting ends of the front cross-bar, and the chains and levers, as described, for operating said drop-braces to steady the vehicle when getting in and out of the same, substantially as specified.

4. The combination, with a sectional vehicle-body, one portion of which is rigidly mounted and the other provided with springs, of the axle provided with supporting-wheels and connected by the reach to the front cross-bar of the vehicle, the longitudinal bar connected to the reach, the front cross-bar and the short cross-bar next in rear of the front cross-bar, the caster-wheel supporting the front end of the vehicle, and mechanism, substantially as described, for propelling and guiding the vehicle, as set forth.

In testimony that we claim the foregoing as our own we have hereto affixed our signatures in presence of two witnesses.

ROBERT FULLER ELLIS.
CORNELIUS ASBURY NORMAN.

Witnesses:
W. C. THOMPSON,
J. K. P. RUCKER.